(12) United States Patent
Berenbaum et al.

(10) Patent No.: US 7,991,514 B2
(45) Date of Patent: Aug. 2, 2011

(54) PROCESSOR TEMPERATURE MEASUREMENT THROUGH MEDIAN SAMPLING

(75) Inventors: Alan D. Berenbaum, New York, NY (US); Richard E. Wahler, St. James, NY (US); Eileen M. Marando, Bellmore, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 32 days.

(21) Appl. No.: 11/557,405

(22) Filed: Nov. 7, 2006

(65) Prior Publication Data

US 2008/0125915 A1    May 29, 2008

(51) Int. Cl.
*G05D 23/00* (2006.01)
(52) U.S. Cl. .......................... 700/300; 700/276; 361/695
(58) Field of Classification Search .................. 700/299, 700/300, 278, 301
See application file for complete search history.

(56) References Cited

U.S. PATENT DOCUMENTS

| | | | |
|---|---|---|---|
| 3,988,730 A | | 10/1976 | Valker |
| 4,926,364 A | * | 5/1990 | Brotherton .................... 702/179 |
| 5,864,583 A | | 1/1999 | Ozkan |
| 6,188,189 B1 | * | 2/2001 | Blake ........................... 318/471 |
| 6,480,127 B1 | | 11/2002 | Aslan |
| 6,621,239 B1 | * | 9/2003 | Belliveau ..................... 315/312 |
| 6,808,307 B1 | | 10/2004 | Aslan et al. |
| 6,996,441 B1 | * | 2/2006 | Tobias ............................ 700/44 |
| 7,036,027 B2 | * | 4/2006 | Kim et al. ...................... 713/300 |
| 2002/0084905 A1 | | 7/2002 | Nale et al. |
| 2004/0263351 A1 | * | 12/2004 | Joy et al. .................. 340/870.01 |
| 2006/0206291 A1 | * | 9/2006 | Bash et al. ..................... 702/194 |
| 2007/0285238 A1 | * | 12/2007 | Batra .......................... 340/572.1 |
| 2008/0047282 A1 | * | 2/2008 | Bodin et al. .................... 62/129 |

OTHER PUBLICATIONS

"Thermal management solutions include support for Intel platform environmental control interface" By Paul O'Shea (Oct. 16, 2006). (http://www.powermanagementdesignline.com/products/193303144).*

* cited by examiner

*Primary Examiner* — Zoila E. Cabrera
*Assistant Examiner* — Nathan Laughlin
(74) *Attorney, Agent, or Firm* — Meyertons Hood Kivlin Kowert & Goetzel, P.C.; Jeffrey C. Hood (57) ABSTRACT

Temperature readings obtained within a computer system from the location of monitored circuit elements may be oversampled at least three times, and a median average of the three parameter readings rather than the arithmetic mean may be used for controlling a device, e.g. a fan, configured to regulate the environmental parameter, e.g. temperature, a the location of the monitored circuit elements. For example, when a CPU temperature reading is requested by the system comprising the CPU, a thermal monitoring system may acquire at least three consecutive temperature readings of the CPU, discard the highest temperature reading and the lowest temperature reading, and return the median reading to be used in controlling a fan configured to regulate temperature at the location of the CPU, resulting in more accurate temperature readings and more accurate fan control. In various implementations, more than three readings may be considered at a time, and running averages based on median values may be computed in a variety of ways to obtain a temperature control value to control the fan.

31 Claims, 4 Drawing Sheets

| Reading Time | Temperature Reading |
|---|---|
| 1 | 50 |
| 2 | 48 |
| 3 | 52 |
| 4 | 53 |
| 5 | 51 |
| 6 | 100 |
| 7 | 53 |
| 8 | 52 |
| 9 | 51 |
| 10 | 52 |

Table 1

| Reading Time | Temperature Readings | Temperature Reading Used |
|---|---|---|
| 1 | 50,52,51 | 51 |
| 2 | 48,49,50 | 49 |
| 3 | 51,50,52 | 51 |
| 4 | 53,54,53 | 53 |
| 5 | 51,50,51 | 51 |
| 6 | 52,100,53 | 53 |
| 7 | 53,54,54 | 54 |
| 8 | 52,53,51 | 52 |
| 9 | 51,50,29 | 50 |
| 10 | 52,51,50 | 51 |

Table 2

| Reading Time | Temperature Reading | Running Group | 5 Element Running Ave. | 3-of-5 Median Value | 3-of-5 Median Running Ave. |
|---|---|---|---|---|---|
| 1 | 50 | - | - | - | - |
| 2 | 48 | - | - | - | - |
| 3 | 52 | - | - | - | - |
| 4 | 53 | - | - | - | - |
| 5 | 51 | 50,48,52,53,51 | 50.8 | 50,51,52 | 51 |
| 6 | 100 | 48,52,53,51,100 | 60.8 | 51,52,53 | 53 |
| 7 | 53 | 52,53,51,100,53 | 61.8 | 52,53,53 | 54 |
| 8 | 52 | 53,51,100,53,52 | 61.8 | 52,53,53 | 52 |
| 9 | 51 | 51,100,53,52,50 | 61.4 | 51,52,53 | 50 |
| 10 | 52 | 100,53,52,50,52 | 61.6 | 52,52,53 | 51 |

Table 3

FIG. 4

PROCESSOR TEMPERATURE MEASUREMENT THROUGH MEDIAN SAMPLING

BACKGROUND OF THE INVENTION

1. Field of the Invention

This invention relates generally to the field of temperature measurement in electronics and computer systems, and, more particularly, to the design of temperature measurement devices to obtain accurate temperature readings for controlling the rotational speed of cooling fans.

2. Description of the Related Art

Many digital systems, especially those that include high-performance, high-speed circuits, are prone to operational variances due to temperature effects. Devices that monitor temperature and voltage are often included as part of such systems in order to maintain the integrity of the system components. Personal computers (PC), signal processors and high-speed graphics adapters, among others, typically benefit from such temperature monitoring circuits. For example, a central processor unit (CPU) that typically "runs hot" as its operating temperature reaches high levels may require a temperature sensor in the PC to insure that it doesn't malfunction or break due to thermal problems. Accurate temperature measurement of processors is therefore necessary when using high performance, high current processors in PCs and/or servers.

Often, integrated circuit (IC) solutions designed to measure temperature in a system will monitor the voltage across one or more PN-junctions, for example a diode or multiple diodes at different current densities to extract a temperature value. Temperature-to-digital conversion for IC-based temperature measuring solutions is often accomplished by measuring a difference in voltage across the terminals of a diode when different current densities are forced through the PN junctions of the diode. The resulting change ($\Delta V_{BE}$) in the base-emitter voltage ($V_{BE}$) between the diodes is generally proportional to temperature.

Some IC manufacturers began incorporating temperature monitoring and the monitoring of other possible environmental variables within the ICs themselves, oftentimes providing measurement readings to other system components. Those other system components would then typically use these readings to control selected environment variables through a variety of means. One example of such built-in monitoring is Intel Corporation's PECI (Platform Environment Control Interface), which includes a digital bus designed, among others things, to carry Intel CPU temperature readings to an environmental monitor or fan controller.

Fans are often used to evacuate warm air from enclosures in which electronic systems are contained. For example, most computer systems include one or more cooling fans to aid in circulating the air inside the enclosures and for maintaining the temperature inside the enclosures within an acceptable range. The increased airflow provided by fans typically aids in eliminating waste heat that may otherwise build up and adversely affect system operation. Employing cooling fans is especially helpful in ensuring proper operation for CPUs with relatively high operating temperatures.

Control of fans in a system typically involves a fan control unit executing a fan control algorithm. A fan control algorithm may determine the method for controlling one or more fans that are configured to evacuate warm air from a system enclosure. For example, the fan control algorithm may specify that a fan's speed should be increased or decreased dependent upon a detected temperature, which in case of processor cooling could mean the processor temperature. Such control algorithms may also involve turning off a fan if the temperature is deemed cool enough to do so. For detecting the temperature of a processor, a temperature sensor may provide to the fan control unit a signal indicative of the current temperature of the processor.

Because a fan operating at high speed can typically be noisy, it is generally desirable to run the fan as slowly as possible, while maintaining the processor temperature in a safe zone. An accurate temperature reading is therefore necessary to make sure the fan cooling is effective. However, it may be difficult to obtain accurate measurements using remote temperature readings. For example, accuracy can be a problem with Intel Corporation's PECI bus. Periodically, PECI readings may fail without an error indication, returning temperatures that diverge widely from the correct temperature. More specifically, one issue with PECI is that isolated temperature readings may be very much larger or smaller than the actual temperature.

There are at least a couple of ways in which the inaccuracy of temperature measurements for fan controllers has been addressed. One common method is to take the arithmetic mean of a number of temperature readings before returning a reading to a fan controller. However, even if the arithmetic mean of a series of readings is used, an outlier reading may still distort the temperature reading. For example, if a system was at a constant 50 degrees and there are 4 readings of 50 degrees and one reading of 100 degrees, the arithmetic mean would be 60 degrees, or 20% above the actual temperature. Fan speed would be increased to compensate, even though the increase was not truly necessary. A running average, where the arithmetic mean is used over a specified number of readings, would be affected even more, since the one outlier would continue to influence the running average for as long as any readings were included in the average.

Another method typically used to compensate for the inaccuracy of temperature measurements is to control the rate at which fan speed may change over a period of time, such that a sudden increase in apparent CPU temperature will not cause a sudden increase in fan speed. Slowing the change rate of fan speed may typically mitigate the effect of a sudden apparent temperature increase or decrease. However, an extreme reading will still cause a fan to ramp up or ramp down, and so it may still unnecessarily increase noise levels.

Other corresponding issues related to the prior art will become apparent to one skilled in the art after comparing such prior art with the present invention as described herein.

SUMMARY OF THE INVENTION

In one set of embodiments, environmental parameter readings, e.g. temperature readings, obtained from one or more monitored circuit elements and/or integrated circuits via a specifically designated bus, such as Intel's Platform Environment Control Interface (PECI), may be oversampled at least three times, and a median average of the three parameter readings rather than the arithmetic mean may be used for controlling a device, e.g. a fan, configured to regulate the environmental parameter, e.g. temperature, at the location of the circuit elements and/or integrated circuits. In one embodiment, when a CPU temperature reading is requested by the system comprising the CPU, a thermal monitoring system would acquire three temperature readings of the CPU over the PECI bus, discard the highest temperature reading and the lowest temperature reading, and return the median reading to be used in controlling a fan configured to evacuate air from the location of the CPU. Isolated outlier readings, on either the high side or the low side, may thereby be discarded, resulting in more accurate temperature readings and thus more accurate fan control.

In another set of embodiments, more than three environmental parameter readings at a time may be considered when determining the control value to be provided to control the fan, or fans. For example, a running average based on N readings (N being an integer greater than 2) may be calculated after the highest and lowest readings within the group of N readings have been discarded. In another set of embodiments, as temperature readings are obtained, a median value of the current latest three readings may be selected and stored until a specified number of median values have been thus obtained. A running average value of this specified number of median values may then be computed and used for controlling a fan or fans to evacuate air from the location of the monitored circuit.

Various embodiments may be implemented either in hardware, as control logic or finite state machines, or in software, which may be executed by a processor or controller.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

Figure 1:
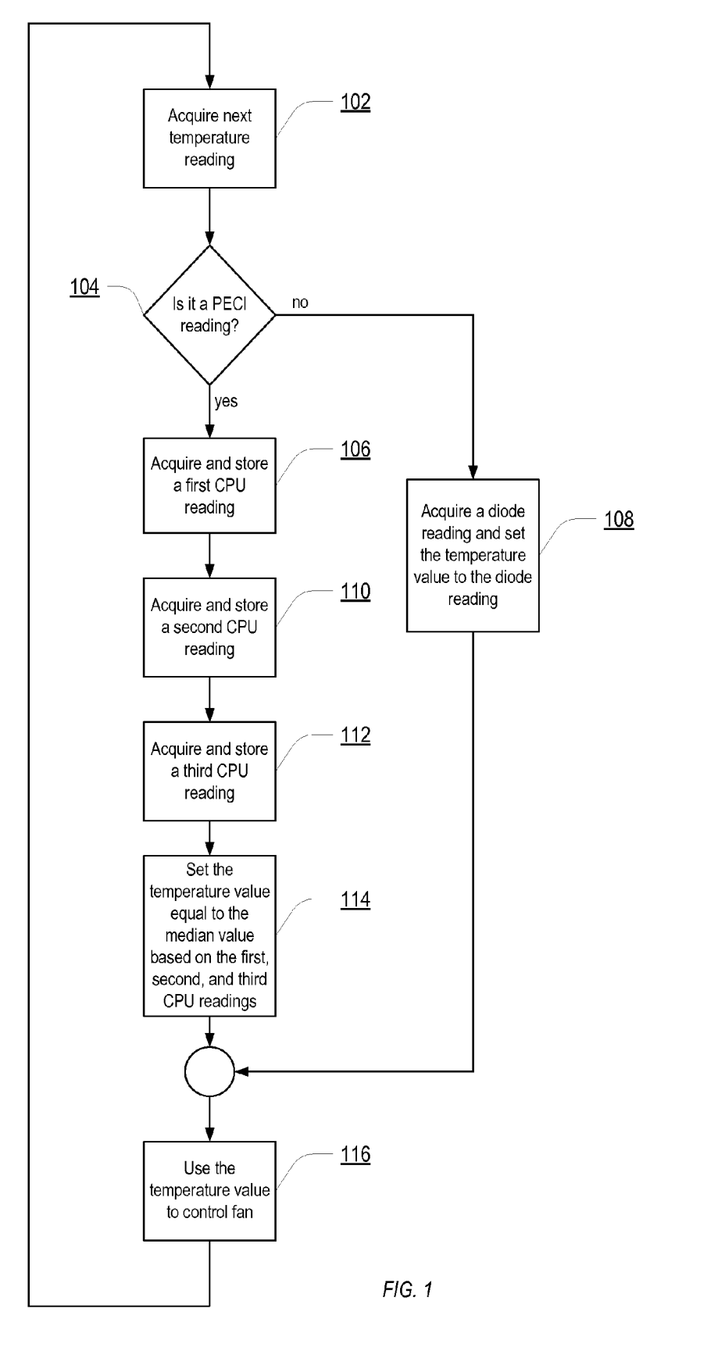
FIG. 1 shows a flowchart for a method to perform median sampling on temperature readings according to one embodiment.

FIG. 1 shows one embodiment of a method for oversampling environmental parameter readings, e.g. temperature readings, obtained within a system, e.g. a computer system, from one or more monitored circuit elements and/or integrated circuits via a specifically designated bus, such as Intel's Platform Environment Control Interface (PECI). While in operation, the system may be instructed to acquire the next temperature reading (102), and may further be instructed whether the reading is a PECI reading (104). Note that what is referred to in this case as PECI readings may generally refer to readings generated via means that may not be under direct control of the monitoring system, and may therefore return values that may be erroneously much higher or much lower than the actual value of the environmental parameter (e.g. temperature) that the readings are meant to convey. Accordingly, the system may be instructed that the reading is not such a reading (e.g. not a PECI reading), but rather, in case of temperature monitoring, a temperature reading possibly obtained directly from a diode configured at the location of the monitored circuit elements/integrated circuit(s) specifically for obtaining temperature readings. Various means and methods for obtaining temperature readings from diodes are well known in the art and will not be discussed here in detail.

In case the system is instructed to obtain a non-PECI reading, the non-PECI reading, for example a temperature reading from a diode, may be obtained (108), and that value may be used to control a device, e.g. a fan, configured to regulate the temperature at the location of the monitored circuit elements/integrated circuit (116). The system may then be instructed to get a next temperature reading at a specified time or after a specified time period has elapsed (102).

In case the system is instructed to obtain a PECI reading, which may be provided by a central processing unit (CPU) configured to provide PECI temperature readings of the CPU temperature, three consecutive readings may be acquired and stored (106, 110, 112). The median value of the three stored temperature readings may then be determined (114) and provided as the temperature value to use for controlling the fan configured to regulate the temperature at the CPU's location (116). As used here, median value refers to the value from the three temperature reading values that is less than or equal to one of the other two values and greater than or equal to the other one of the other two values. For example, the median value of three temperature readings comprising 54, 53, and 80, the median value would be 54. In other words, the highest of the three temperature reading values and the lowest of the three temperature reading values may be discarded, leaving the only remaining temperature reading value as the median value.

It should be noted that the method illustrated in FIG. 1 may be modified to obtain a control temperature value in a variety of other ways, all based on the use of median values. For example, in another set of embodiments, more than three temperature parameter readings may be considered at a time. Thus, additional values may be acquired following the acquisition and storage of the third CPU reading (event 112), and a running average value may be obtained using median values. For example, a running average based on N readings (N being an integer greater than 2) may be calculated after the highest and lowest readings within the group of N readings have been discarded. In another set of embodiments, as temperature readings are acquired, a median value may be obtained from the latest three readings for each new acquired reading, and stored until a specified number of median values have been thus obtained. A running average value of this specified number of median values may then be computed and used as the temperature control value for controlling a fan or fans.

Figure 4:
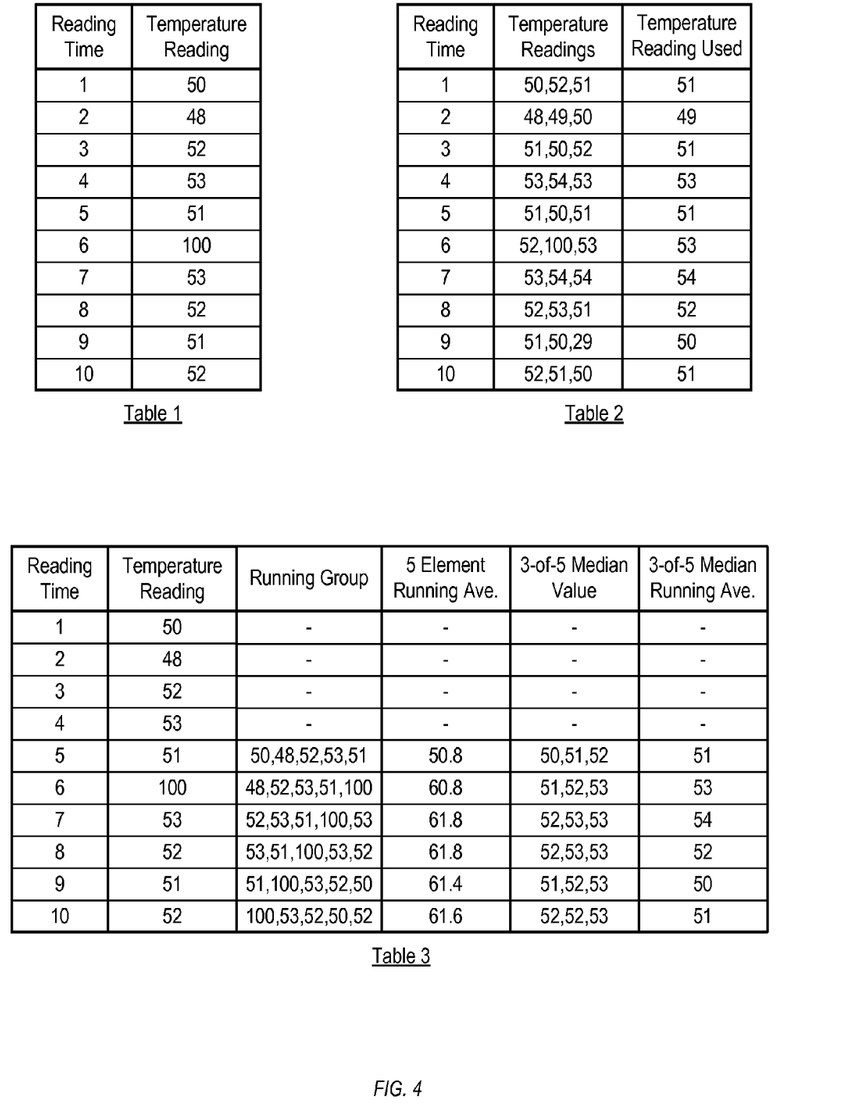
FIG. 4 shows three tables of examples of temperature readings and various arithmetic mean and median values used for obtaining a temperature control value for controlling a fan.

To illustrate the principle of the method shown in FIG. 1, FIG. 4 shows a Table 1 containing a sequence of—in this case—PECI readings obtained from a CPU (note that the sequence may have been obtained over a bus/transmission medium other than a PECI bus and from a monitored device other than a CPU, and the principles discussed herein would equally apply to readings acquired via alternative methods). As seen in Table 1, temperature reading at reading time 6 is likely an outlier that may be the result of a faulty temperature reading relayed to the temperature control system/circuit, in this case a faulty PECI reading. Thus, the temperature reading at reading time 6 does not represent the actual temperature of the CPU. If a fan were to be controlled according to the readings shown in Table 1, it would be forced to spin up to full speed following the acquisition of the temperature reading at reading time 6, to cool the apparently overheated processor, with an accompanying increase in fan noise.

Table 2 in FIG. 4 shows which temperature readings may be used if at a given reading time, instead of a single reading, at least three readings are performed, and the median value of the three readings is used for controlling the fan. A spurious 100 degree reading at time 6 may now be ignored, and the temperature readings used to control the fan may stay much closer to their likely true values. A spurious low reading of 29 at time 9 may also be similarly ignored. It should also be noted at this time that as shown in Table 2, a new set of readings is performed for each request given to the system for obtaining a temperature measurement (event 102 in FIG. 1). However, a running number of current temperature readings may also be stored if temperature readings are to be frequently performed, and a median value of the currently stored three temperature readings may be used to control the fan. For example, a specified number of readings may be stored and the stored values may be treated as a queue, where for each new reading an oldest reading may be replaced or overwritten by the new reading. The lowest and highest value readings from among the presently stored readings could then be discarded, and the temperature control value may be determined from the remaining presently stored values. Thus, a new temperature control value could be provided upon having acquired each new temperature reading.

A running average of temperature readings could also be improved by following similar procedures. Using the values in Table 1 of FIG. 4 as an example, Table 3, also shown in FIG. 4, may be constructed. Table 3 shows how a running average of 5 values compares with using a running average of the 3 median values out of a group of 5 values. A running group may indicate a group of readings where a specified number of temperature readings, in this case 5 readings, are stored, and for each new temperature reading the oldest temperature reading is replaced by the new temperature reading (as also previously described above). The third column in Table 3 shows the current running group of readings at each given reading time. The fourth column shows the running average calculated from the current running group of readings for each given reading time. The fifth column shows the 3 median values selected from the current running group of readings for each given reading time. Finally, the sixth column shows the running average calculated from the 3 median values for each given reading time. For example, as indicated in Table 3, the running average of temperature readings for reading times 6 through 10 have values of over 60 degrees, or about 20% over the actual readings of around 50 degrees, due to the contribution of the spurious 100 degree reading at time 6. However, the median average values shown in the last column of Table 3 do not reflect any effects of the spurious reading.

Figure 2:
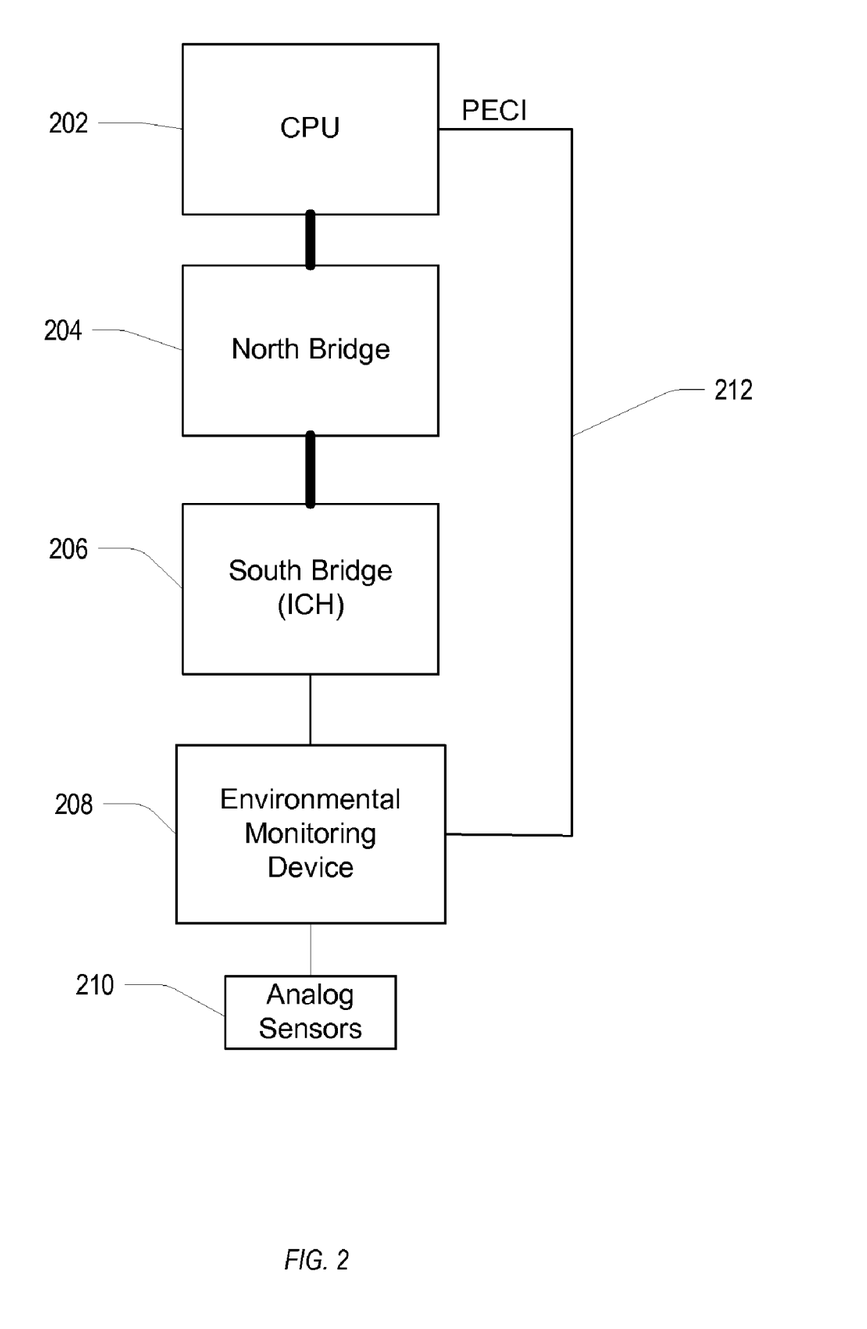
FIG. 2 shows a block diagram of one embodiment of a system that incorporates temperature measurement.

FIG. 2 shows a computer system that may be configured to perform temperature monitoring and/or control by utilizing PECI bus 212. CPU 202 may be configured to provide temperature readings over PECI bus 212 to environmental monitoring device 208, which may be a circuit and/or logic block and/or controller configured to receive the temperature readings provided by CPU 202. A typical computer system may also include a North Bridge 204, a South Bridge 206. The system may also feature an analog sensor circuit/block 210, which may be configured to provide direct temperature readings to monitoring device 208 in addition to the temperature readings provided by CPU 202 over PECI bus 212. For example, analog sensor block 210 may comprise temperature diodes configured obtain temperature readings based on the change in junction voltage across the diode channel. Analog sensor block 210 may equally include any other device similarly configured to provide temperature readings.

The various embodiments of the method outlined above and shown in FIG. 1 may be implemented either fully in hardware or fully in software or as a combination of both. For example, in one set of embodiments, monitoring device 208, which may specifically be a temperature monitoring device, may include a controller or processor operable to execute an algorithm based on the flowchart shown in FIG. 1. In alternative embodiments, monitoring device 208 may comprise logic circuitry designed to implement the flowchart shown in FIG. 1.

Figure 3:
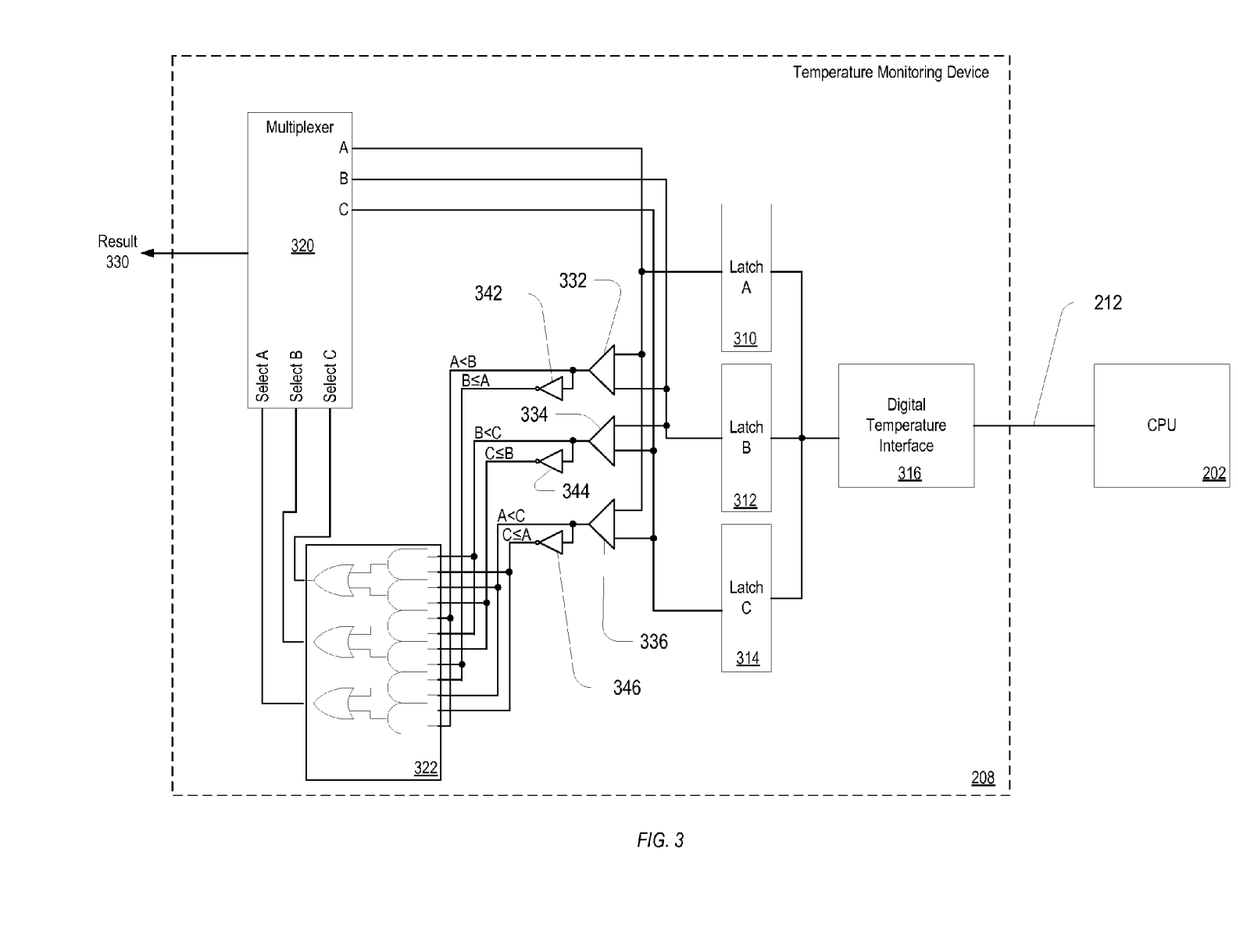
FIG. 3 shows a logic diagram of one embodiment of the flowchart shown in FIG. 1.

FIG. 3 shows one possible hardware implementation of monitoring device 208. In this embodiment, temperature monitoring device 208 includes a digital temperature interface (DTI) 316 configured to interface with PECI bus 212 to receive temperature readings from CPU 202. DTI 316 may further be configured to route and latch the value of each one of three consecutive temperature readings received from CPU 202 into latches 310, 312 and 314, respectively. The values may each respectively be provided by their corresponding latches (310, 312 and 314) as value inputs to multiplexer 320. The select signals for multiplexer 320 may be generated according to the median value of the three values stored in latches 310, 312 and 314, respectively. Comparator 332 may compare the contents of latches 310 and 312, comparator 334 may compare the contents of latches 312 and 314, and comparator 336 may compare the contents of latches 310 and 314. The outputs from comparators 332, 334 and 336 may then be used to form select signals Select A, Select B and Select C, through logic gates 322. The result 330 provided by multiplexer 320 may therefore reflect the median value of the three values stored in latches 310, 312 and 314. Result 330 may be provided to a control circuit configured to control the rotational speed of a fan, or any other device configured to regulate temperature or any other environmental variable at the location of CPU 202.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A method for controlling at least one fan via a monitoring system, the method comprising:

receiving a request for a single parameter reading to be performed via means not under control of the monitoring system;

acquiring a plurality of consecutive parameter values in response to said receiving the request for the single parameter reading, wherein the plurality of consecutive parameter values correspond to the single parameter reading;

for each current parameter value of the plurality of consecutive parameter values:
selecting a parameter value from three consecutive parameter values comprising the current parameter value and most recent two previous consecutive parameter values, wherein the selected parameter value is less than or equal to one of the remaining two parameter values of the three consecutive parameter values, and greater than or equal to the other one of the remaining two parameter values of the three consecutive parameter values;
updating a temperature control value according to the selected parameter value; and
controlling a rotational speed of the at least one fan according to the temperature control value.

2. The method of claim 1, further comprising performing said acquiring, said selecting, said updating, and said controlling a plurality of times.

3. The method of claim 1, further comprising generating a control signal based on the temperature control value and using the control signal to control the rotational speed of the at least one fan.

4. The method of claim 3, wherein the control signal is a duty cycle of a PWM (Pulse Width Modulated) signal used for powering the at least one fan.

5. The method of claim 1, wherein the plurality of consecutive parameter values are consecutive temperature values.

6. The method of claim 5, wherein the consecutive temperature values are of a temperature of a specified temperature region within a computer system.

7. The method of claim 6, wherein the specified temperature region corresponds to a CPU (Central Processing Unit).

8. A monitoring system for obtaining an environmental reading and controlling at least one fan, the system comprising:
a digital interface device configured to acquire a plurality of consecutive parameter readings generated via means that are not under direct control of the monitoring system, the plurality of consecutive parameter readings corresponding to a requested single parameter reading, and generate a plurality of parameter values, each one of the plurality of parameter values corresponding to a respective one of the plurality of consecutive parameter readings; and
logic circuitry coupled to the digital interface and configured to select, for each current parameter reading of the plurality of consecutive parameter readings, a parameter value from three consecutive parameter values corresponding to the current parameter reading and most recent two previous consecutive parameter readings, wherein the selected parameter value is less than or equal to one of the remaining two parameter values of the three consecutive parameter values, and greater than or equal to the other one of the remaining two parameter values of the three consecutive parameter values;
wherein the logic circuitry is configured to provide the selected parameter value to a control circuit configured to control a rotational speed of the at least one fan according to at least the selected parameter value.

9. The system of claim 8, wherein the logic circuitry is configured to store at least three of the plurality of parameter values at a time.

10. The system of claim 9, wherein the logic circuitry comprises at least three latches, each one of the at least three latches configured to hold a different respective one of the at least three of the plurality of parameter values.

11. The system of claim 8, wherein the plurality of consecutive parameter readings comprise a plurality of consecutive temperature readings.

12. The system of claim 8, wherein the digital interface is configured to acquire the plurality of consecutive parameter readings over a PECI (Platform Environment Control Interface) bus.

13. A system comprising:
a bus;
a first circuit configured to consecutively provide plurality of environmental parameter readings over the bus in response to each request for a single parameter reading, wherein the plurality of consecutive environmental parameter readings are indicative of at least one environmental variable at the first circuit's location;
a first device configured to control the at least one environmental variable at the first circuit's location; and
a second circuit configured to receive the plurality of consecutive environmental parameter readings over the bus, wherein for each newly received environmental parameter reading of the plurality of consecutive environmental parameter readings, the second circuit is configured to:
select an environmental parameter reading from three consecutive environmental parameter readings comprising the newly received environmental parameter reading and two most recent previously received consecutive environmental parameter readings, and provide the selected environmental parameter reading to the first device to control the first device, to adjust the at least one environmental variable according to the environmental parameter readings;
wherein the selected environmental parameter reading is less than or equal to one of the remaining two environmental parameter readings of the three consecutive environmental parameter readings, and greater than or equal to the other one of the remaining two environmental parameter readings of the three consecutive environmental parameter readings.

14. The system of claim 13, wherein the second circuit is further configured to:
generate three parameter values, wherein each one of the three parameter values corresponds to a respective one of the three consecutive environmental parameter readings; and
provide a first one of the three parameter values to the first device to control the first device, thereby controlling the at least one environmental variable according to the environmental parameter readings;
wherein the first one of the parameter values is less than or equal to a second one of the three parameter values and greater than or equal to a third one of the three parameter values.

15. The system of claim 13, wherein the environmental parameter readings are temperature readings, wherein the first device is a fan, and wherein in controlling the first device, the second circuit is configured to control a rotational speed of the fan.

16. The system of claim 13, wherein the first circuit is a central processing unit, and wherein the bus is a PECI (Platform Environment Control Interface) bus.

17. A method for controlling at least one device configured to control at least one environmental variable in a computer system, the method comprising:

consecutively receiving a plurality of requests for reading corresponding respective single parameters indicative of conditions of the at least one environmental variable, the plurality of requests comprising a first request and one or more additional requests;

consecutively acquiring respective N single parameter readings corresponding to the first request, to obtain current respective N consecutive parameter readings, in response to receiving the first request;

acquiring a respective single parameter reading corresponding to each given request of the one or more additional requests, in response to receiving each given request;

for each given request of the one or more additional requests, discarding a least recently acquired parameter reading of a most recently acquired previous N consecutive parameter readings, to update the current respective N consecutive parameter readings to comprise most recently acquired previous respective N−1 consecutive parameter readings and the acquired respective single parameter reading corresponding to the given request;

for each current respective N consecutive parameter readings:
discarding a first one of the current respective N consecutive parameter readings having a lowest value;
discarding a second one of the current respective N consecutive parameter readings having a highest value; and
using remaining ones of the current respective N consecutive parameter readings to obtain a control value to control the at least one device, to adjust the at least one environmental variable;
wherein N is an integer greater than 2.

18. The method of claim 17, wherein said using remaining ones of the current respective N consecutive environmental parameter readings comprises:
setting the control value to an average value of the remaining ones of the current respective N consecutive environmental parameter readings; and
using the average value to control the at least one device.

19. The method of claim 17, wherein the at least one environmental variable is temperature, wherein the environmental parameter readings comprise temperature readings, and wherein the at least one device is a fan.

20. The method of claim 17, further comprising: storing the current respective N consecutive environmental parameter readings prior to said discarding the first one of the current respective N consecutive environmental parameter readings, said discarding the second one of the current respective N consecutive environmental parameter readings, and said using remaining ones of the current respective N consecutive environmental parameter readings.

21. A non-transitory memory medium configured to store instructions executable to:
consecutively receive a plurality of requests for reading corresponding respective single parameters indicative of conditions of at least one environmental variable, the plurality of requests comprising a first request and one or more additional requests;
consecutively acquire respective N single parameter readings corresponding to the first request, to obtain current respective N consecutive single parameter readings, in response to the first request;
acquire a respective single parameter reading corresponding to each given request of the one or more additional requests, in response to each given request;
for each given request of the one or more additional requests, discard a least recently acquired single parameter reading of a most recently acquired previous N consecutive single parameter readings, to update the current respective N consecutive single parameter readings to comprise most recently acquired previous respective N−1 consecutive single parameter readings and the acquired respective single parameter reading corresponding to the given request;

for each current respective N consecutive single parameter readings:
discard a first one of the respective N consecutive single parameter readings having a lowest value;
discard a second one of the current respective N consecutive single parameter readings having a highest value; and
use remaining ones of the current respective N consecutive single parameter readings to obtain a control value to control the at least one device, to adjust the at least one environmental variable;
wherein N is an integer greater than 2.

22. The memory medium of claim 21, further configured to store instructions executable to:
set the control value to an average value of the remaining ones of the current respective N consecutive environmental parameter readings.

23. The memory medium of claim 22, further configured to store instructions executable to:
store the current respective N consecutive single environmental parameter readings prior to:
discarding the first one of the current respective N consecutive single environmental parameter readings; and
discarding the second one of the current respective N consecutive single environmental parameter readings.

24. A system comprising:
a bus;
a first circuit configured to:
consecutively provide respective N single parameter readings over the bus in response to a first request for a single parameter reading, to obtain current respective N consecutive single parameter readings, wherein N is an integer greater than 2;
provide an additional respective single parameter reading over the bus in response to each additional request for a single parameter reading subsequent to the first request;
wherein each single parameter reading is indicative of conditions of at least one environmental variable at the first circuit's location;
a first device configured to adjust the at least one environmental variable at the first circuit's location; and
a second circuit configured to:
receive the respective N single parameter readings over the bus;
receive each additional respective single parameter reading corresponding to each additional request over the bus;
for each respective single parameter reading corresponding to each additional request, discard a least recently acquired single parameter reading of a most recently acquired previous N consecutive single parameter readings, to update the current respective N consecutive single parameter readings to comprise most recently acquired previous respective N−1 consecutive single parameter readings and the additional respective single parameter reading;

for each current respective N consecutive single parameter readings:
  discard a first one of the respective N consecutive single parameter readings having a lowest value;
  discard a second one of the current respective N consecutive single parameter readings having a highest value; and
  use remaining ones of the current respective N consecutive single parameter readings to obtain a control value to control the first device, to adjust the at least one environmental variable at the first circuit's location.

25. The system of claim 24, wherein the second circuit is further configured to generate a respective parameter value corresponding to each respective single parameter reading, and generate the control value from respective parameter values corresponding to the remaining ones of the current respective N consecutive single parameter readings.

26. The system of claim 24, wherein each respective single parameter reading is a temperature reading, wherein the first device is a fan, and wherein in controlling the first device, the second circuit is configured to control a rotational speed of the fan.

27. The system of claim 24, wherein the first circuit is a central processing unit, and wherein the bus is a PECI (Platform Environment Control Interface) bus.

28. A monitoring system for obtaining environmental readings and controlling at least one device according to the obtained environmental readings, the system comprising:
  a digital interface device configured to:
    consecutively acquire respective N single parameter readings corresponding to a first reading request for a single parameter, wherein N is an integer greater than 2;
    consecutively acquire one or more additional single parameter readings, each single parameter reading of the one or more additional single parameter readings corresponding to a respective additional reading request for a single parameter subsequent to the first reading request; and
    generate a respective parameter value corresponding to each respective single parameter reading, wherein a current respective N parameter values correspond to a most recently acquired N consecutive single parameter readings; and
  logic circuitry coupled to the digital interface and configured to:
    for each given additional parameter reading of the one or more additional single parameter readings, discard a respective parameter value corresponding to a least recently acquired single parameter reading of a most recently acquired previous N consecutive single parameter readings, to update the current respective N parameter values to comprise respective N−1 parameter values corresponding to most recently acquired previous respective N−1 consecutive single parameter readings, and a respective parameter value corresponding to the given additional parameter reading;
    for each current respective N parameter values:
      discard a first one of the current respective N parameter values having a lowest value;
      discard a second one of the current respective N parameter values having a highest value; and
      use remaining ones of the current respective N parameter values to obtain a control value, and provide the control value to control the at least one device.

29. The monitoring system of claim 28, wherein the at least one device is a cooling fan, and the logic circuitry is further configured to provide the control value to a control circuit configured to control rotational speed of the cooling fan.

30. The monitoring circuit of claim 28, wherein the logic circuitry is further configured to store at least N parameter values at a time.

31. The monitoring circuit of claim 28, wherein the digital interface is configured to acquire the respective N single parameter readings and the one or more additional single parameter readings over a PECI (Platform Environment Control Interface) bus.

* * * * *